United States Patent
Kornylo

[11] Patent Number: 5,387,390
[45] Date of Patent: Feb. 7, 1995

[54] METHOD OF MOLDING A VEHICLE DOOR PANEL WITH A SOFT ARM REST

[75] Inventor: Walter P. Kornylo, Livonia, Mich.

[73] Assignee: Atoma International Inc., Newmarket, Canada

[21] Appl. No.: 51,543

[22] Filed: Apr. 26, 1993

[51] Int. Cl.⁶ ............................................. B29C 67/22
[52] U.S. Cl. ............................. 264/46.8; 264/46.4; 264/46.6
[58] Field of Search ................. 264/46.4, 46.7, 46.8, 264/511, 257, 46.6

[56] References Cited

U.S. PATENT DOCUMENTS

| | | | |
|---|---|---|---|
| 4,740,417 | 4/1988 | Tornero | 264/511 |
| 4,766,025 | 8/1988 | Sanok et al. | 264/46.8 |
| 4,810,452 | 3/1989 | Taillefert et al. | 264/46.4 |
| 4,923,539 | 5/1990 | Spengler et al. | 156/79 |
| 5,037,591 | 8/1991 | Rohrlach et al. | 264/46.8 |
| 5,082,609 | 1/1992 | Rohrlach et al. | 264/46.4 |
| 5,091,031 | 2/1992 | Strapazzini | 264/46.8 |
| 5,236,534 | 8/1993 | Noguti et al. | 156/245 |

FOREIGN PATENT DOCUMENTS

| | | | |
|---|---|---|---|
| 0411376 | 2/1991 | European Pat. Off. | 264/46.8 |
| 55-140526 | 11/1980 | Japan | 264/46.8 |
| 58-029633 | 2/1983 | Japan | 264/46.8 |
| 60-189432 | 9/1985 | Japan | 264/46.8 |
| 61-297120 | 12/1986 | Japan | |
| 62-009942 | 1/1987 | Japan | 264/46.8 |

*Primary Examiner*—Allan R. Kuhns
*Attorney, Agent, or Firm*—Cushman, Darby & Cushman

[57] ABSTRACT

A method of making an interior panel of a vehicle door having an exterior surface which is to face toward the interior of the vehicle when installed therein. The method includes the steps of heating a laminate sheet comprising (1) an outer layer of vinyl sheet and (2) a layer of relatively soft foamed material bonded thereto and vacuum forming the heated laminate sheet in a vacuum mold component oriented so that an arm rest portion of the laminate sheet is the vinyl sheet surface thereof engaged with the mold surface arm rest portion. Next, a preformed pad of foamed elastomeric material having a density in the range of 30 to 45 pounds per cubic foot is mounted on the opposite surface of the arm rest portion of the heated laminate sheet. Thereafter a foamable polyurethane material embedded within a reinforcing mat is heated and cured while all of the mold components to form a panel which includes (1) a substrate defining the opposite surface thereof, (2) an upwardly facing arm rest portion defined on its exterior surface by the vinyl sheet and backed up therebelow by the layer of relatively soft foamed material and the pad of foamed elastomeric material.

7 Claims, 2 Drawing Sheets

METHOD OF MOLDING A VEHICLE DOOR PANEL WITH A SOFT ARM REST

This invention relates to vehicle door panels and more particularly to improvements methods for making vehicle door panels relating to the provision of arm rest portions on the surface thereof which face the interior of the vehicle when installed therein.

BACKGROUND OF THE INVENTION

There are two different methods for making panels which serve as background for the present invention, both of which result in a somewhat similar panel construction. The difference is that one method is capable of building into the panel more softness by including larger amounts of foamed material. Basically, this softer configuration is used in the more expensive luxury cars, whereas the other method is used basically in the large majority of other vehicles.

The method of making the luxury panel is essentially a two-stage process. In the first stage of the process, a substrate which is in the form of the panel is made by placing a fiberglass reinforcing mat in the lower half of a two-part mold and then filling the lower half of the mold with a foamable material such as liquid polyurethane capable of being cured into a foamed condition. After the foamable material has been inserted into the lower half of the mold, the upper half is moved down and then the foamable material is cured under heat to complete the substrate which is fairly rigid. In the second stage of the process, the substrate molded in the first stage is placed in the upper half of a second two-part mold. The lower part of the mold is in essence a vacuum mold. The second stage procedure is begun by moving a heated sheet of imperforate vinyl over the bottom part of the mold and then drawing by vacuum the heated sheet into the mold so that the three-dimensional configuration is formed on the vinyl. After the vinyl has been moved into engagement with the mold by the vacuum source, an amount of foamable material such as liquid polyurethane is then injected into the mold on top of the vinyl and thereafter the upper part of the mold which contains the substrate is then moved into cooperating relation with the lower part and the foamable material is cured into a relatively soft foamed condition.

The other more economical process is essentially a one-stage process which utilizes a two-part mold, the lower part of which again is a vacuum mold for the vinyl exterior sheet of the door panel to be made. In this case, the vinyl comes as the outer layer of a laminate which includes a layer of foamed material bonded thereto. The laminate is initially heated and then vacuum-drawn into the lower part of the mold. Next, a mat of fiberglass or similar reinforcing is placed inside the laminate vacuum adhered to the lower mold and, thereafter, a liquid polyurethane is added to the lower mold part over the vacuum-held laminate. The upper mold part is then closed and essentially a relatively rigid substrate is molded integrally with the vinyl laminate. In this process, it is not possible to provide much thickness and softness in the foam that is laminated with the vinyl or at least not as much as can be used in the second step of the two step process.

One area where the difference in softness is particularly noticeable is in the arm rest portion of the panel. There is a need in the more economical process to improve the softness of the arm rest portion in a cost effective manner.

SUMMARY OF THE INVENTION

An object of the present invention is to fulfill the need expressed above. Applicant has found that the objective can be achieved by the simple expedient of mounting a foamed pad of elastomeric material within the arm rest area of the laminated sheet after it has been vacuum formed within the vacuum forming mold part, provided the foamed rubber pad has certain softness-hardness characteristics. Applicant has found that where the foamed rubber pad utilized is too soft, it becomes compressed during the substrate molding procedure so that when the thus formed panel is removed from the mold assembly after the substrate has been molded, the compressive forces imparted to the pad during the pressure molding procedure are sufficient to cause the portion of the laminated vinyl defining the upper surface of the arm rest to bulge outwardly and present an unwanted distorted shape once the molding pressure is relieved from the vinyl surface as by removing the panel from the mold assembly. One the other hand, if the foamed pad is made hard enough to clearly avoid this compressive effect, it is too hard to provide the desired improved softness to the arm rest portion of the panel. The method of the present invention which obviates both the too soft compressive effect and the too hard effect includes the steps of heating a laminate sheet comprising (1) an outer layer of vinyl sheet and (2) a layer of relatively soft foamed material bonded thereto, vacuum forming the heated laminate sheet in the vacuum mold component oriented so that an arm rest portion of the laminate sheet is the vinyl sheet surface thereof engaged with the mold surface arm rest portion, mounting a preformed pad of foamed elastomeric material having a density in the range of 30 to 45 pounds per cubic foot on the opposite surface of the arm rest portion of the heated laminate sheet, placing a reinforcing mat over the mold surface defining the exterior surface of the panel and the heated laminate sheet vacuum formed thereon, adding foamable polyurethane material onto the reinforcing mat, and heating and curing the foamable polyurethane material while all of the mold components are in cooperating relation so as to form a panel which includes (1) a substrate defining the opposite surface thereof, (2) an upwardly facing arm rest portion defined on its exterior surface by the vinyl sheet and backed up therebelow by the layer of relatively soft foamed material and the pad of foamed elastomeric material.

DESCRIPTION OF THE PREFERRED EMBODIMENT

Figure 1:
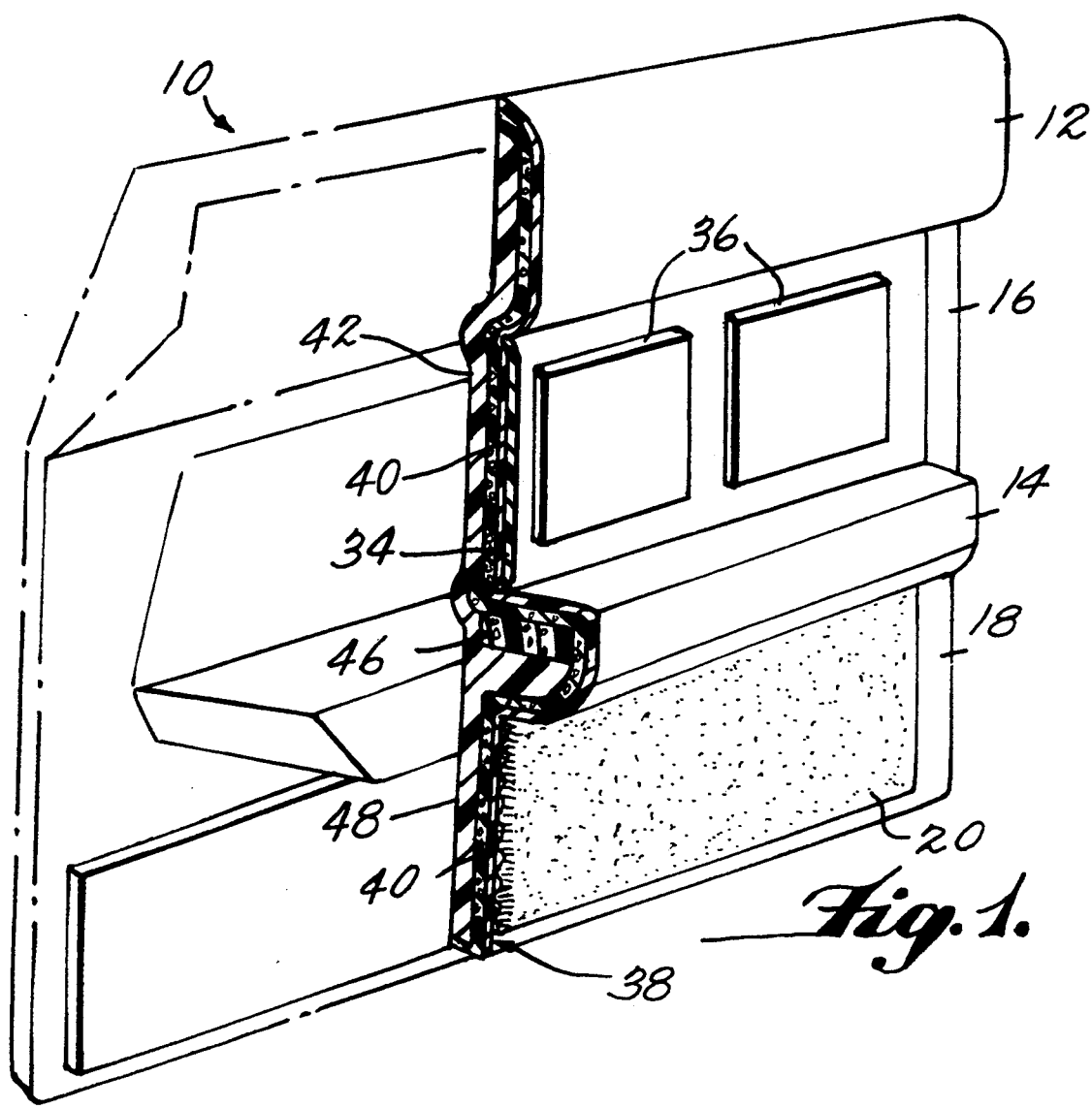
FIG. 1 is a perspective view of a completed vehicle door panel constructed in accordance with a method of the present invention.

Referring now more particularly to the drawings, there is shown in FIG. 1 a vehicle door panel, generally indicated at 10, made by a method according to the principles of the present invention. The door panel 10 includes a window sill upper portion 12 and an arm rest portion 14 defining therebetween a bolster receiving portion 16. A lower planar rug receiving portion 18 having a rug section 20 adhered thereto is disposed below the arm rest portion 14.

The method utilizes a mold assembly, generally indicated at 22. The mold assembly 22 includes a lower mold part or component 24, which is a vacuum forming mold having a mold surface 26 and two sets of vacuum openings 28 and 29 extending from the mold surface 26 to two separate sources of vacuum (not shown). The mold surface 26 includes a portion, indicated at 30, which is positioned to form the bolster receiving portion 16 of the panel 10. The preferred method of the present invention utilizes the bolster providing steps disclosed in my commonly assigned concurrently filed U.S. patent application Ser. No. 08/052,453, the disclosure of which is hereby incorporated by reference into the present specification. The present method is more concerned with the formation of the arm rest portion 14 of the panel 10 and hence in its broadest aspects contemplates the formation of a door panel 10 without a bolster or a door panel having a bolster provided by other known process steps.

Figure 2:
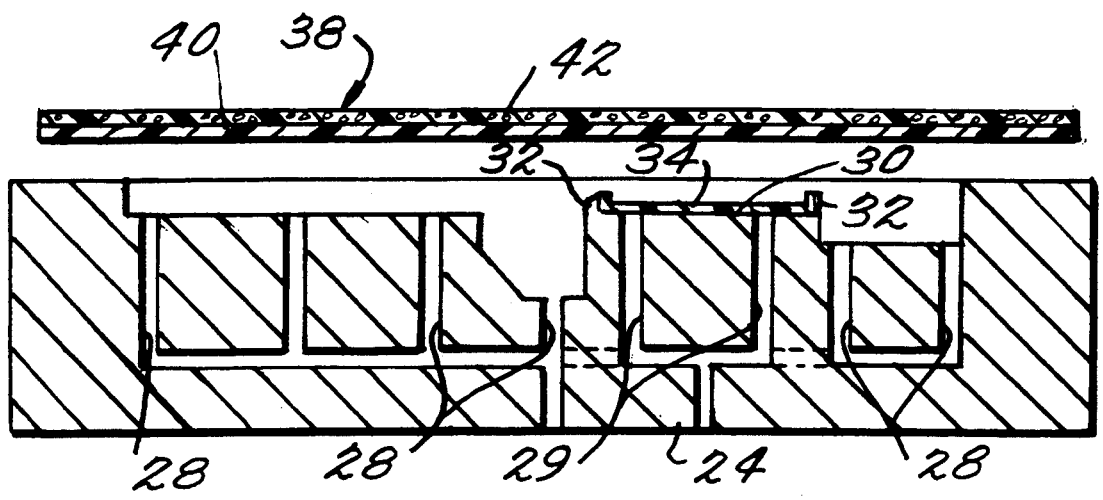
FIG. 2 is a sectional view of a vacuum mold part showing a step in the method according to the present invention.

The bolster receiving portion 30 is defined by a thin projecting peripheral lip 32. FIG. 2 illustrates the first step in the present method and, in this initial step in accordance with the aforesaid application, a bolster laminate 34 is initially prepared for mounting on the portion 30 of the mold surface 26 defined by the peripheral lip 32. The bolster laminate 34 includes a textile outer layer. The textile outer layer may be of any suitable configuration and material as, for example, a knitted, woven, non-woven or otherwise formed textile fabric made from monofilaments and/or staple filaments of one textile material or of different textile materials including synthetic and natural materials such as cotton, wool, silk, linen, polyester, nylon, rayon, polyethylene, polypropylene, vinyl, and blends and mixtures thereof. In a preferred embodiment of the present invention, the textile layer is formed of a synthetic thermoplastic material, as for, example, polyester and the mold surface portion 30 has an appropriate design, such as the embossed squares 36, provided therein which can be imparted by molding under heat and pressure to the textile outer layer of thermoplastic material of the bolster laminate 34.

The bolster laminate 34 also includes an inner layer which is a film formed of material which presents a flexible imperforate layer and an inner surface which becomes tacky when heated. If desired, the bolster laminate 34 may also include an intermediate layer which preferably is of a foamed material. The foamed material is preferably relatively soft and may be of polypropylene, polyethylene, polyvinyl chloride, polyurethane or the like. Here again, a preferred material is polyurethane.

In the embodiment shown in FIG. 1, there is only a single unitary bolster laminate 34 utilized. However, it will be understood that more than one bolster laminate 34 may be utilized and may be positioned in the exterior surface of the door panel 10 in areas other than the bolster receiving portion 16 previously described.

As shown in FIG. 2, the first step in the process is to mount the bolster laminate 34 in the bolster receiving portion 30 of the mold surface 26 of the vacuum mold part 24. The bolster laminate 34 is mounted so that the outer textile surface engages the mold surface portion 30 and a marginal edge portion of the bolster laminate 34 extends along the inwardly facing surface of the peripheral lip 32.

Next, a laminated sheet, generally indicated at 38, is provided which has a surface area sufficient to cover the mold surface 26 which turns upwardly along its periphery. A typical thickness for the laminated sheet 38 is 3½ millimeters.

The laminated sheet 38 includes a vinyl sheet 40 as an outer layer thereof. A layer of relatively soft foam material 42 is laminated to the inner surface of the vinyl sheet 40. The soft foam of the intermediate layer 42 may be provided by many different materials as, for example, polypropylene, polyethylene, polyester, polyvinyl chloride, and polyurethane. A preferred embodiment is polyurethane.

Figure 3:
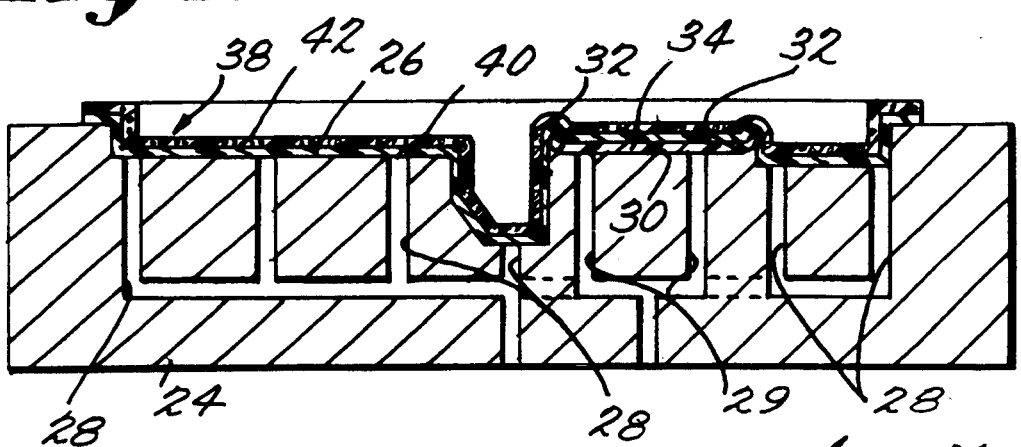
FIG. 3 is a sectional view similar to FIG. 2 showing the completion of the vacuum forming step of the method.

The laminated sheet 38 is heated to a temperature within the range of 300° to 340° F. and then vacuum formed onto the mold surface 26 and the inner layer of the bolster laminate 34 to intimately bond with the latter. FIG. 3 illustrates the condition of the laminate sheet 38 after the vacuum forming step has been completed.

In accordance with the principles of the present invention, the next step in the present method involves the provision of a pad of foamed elastomeric material 46 having a specific softness-hardness characteristic which is used in forming the arm rest portion 14 of the panel 10 so as to build into the arm rest portion 14 a softer more pleasing to the touch arm rest portion than could be formed otherwise. The critical softness-hardness characteristic which is built into the foamed pad 46 is best expressed in terms of its density. The critical density of the foamed rubber pad 46 is within the range of approximately 30 pounds per cubic foot to approximately 45 pounds per square foot. A preferred exemplary foamed pad 46 is formed of polyurethane or polyolefin and has a density of 35 pounds per cubic foot. The pad 46 has an exemplary thickness of ½" within an operative range of ⅛" to ⅝".

Figure 4:
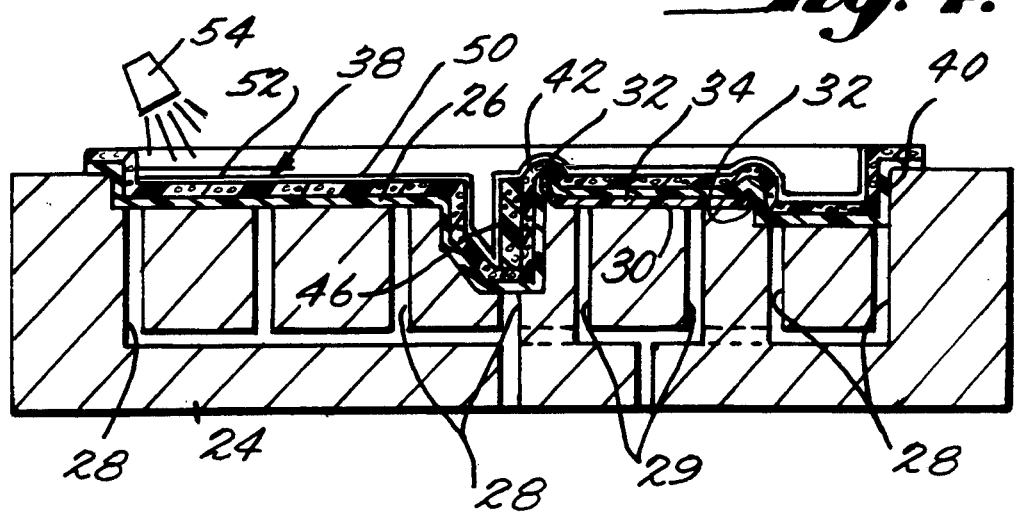
FIG. 4 is a sectional view similar to FIG. 2 showing the start of the substrate forming step of the method.
Figure 5:
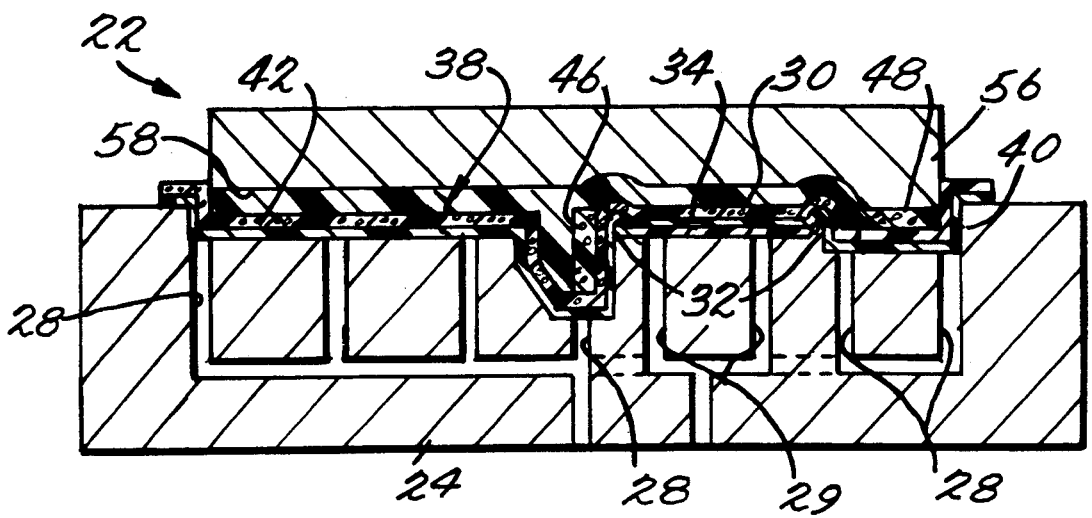
FIG. 5 is a sectional view of the mold assembly including the vacuum mold part shown in FIGS. 2, 3 and 4 showing the completion of the substrate forming step of the method.

In accordance with the principles of the present invention, the foamed rubber pad 46 is next mounted on the film surface of the portion of the laminated sheet 38 engaging the upper surface of the arm rest portion 14. The mounting is such as to retain the foamed pad 46 in the position in which it is mounted throughout the remainder of the steps of the present invention. While other ways and means for insuring the retention of the foamed pad 46 in its proper position may be utilized, a preferred way is simply by the use of a suitable adhesive. FIG. 4 illustrates the condition of the vacuum formed laminated sheet 38 after the foamed pad 46 has been mounted therein.

FIG. 4 also illustrates the next steps in the present method. The next steps of the method are steps which are taken to essentially mold a substrate 48 onto the exposed film surface of the inner film layer 44 and foamed pad 46 adhered thereto which is vacuum formed onto the lower mold part 24. FIG. 4 shows the preferred steps of forming the substrate 48 which includes the initial mounting of a fiberglass reinforcing mat 50 over the foam material surface and then adding a foamable material 52, preferably foamable polyurethane liquid as indicated schematically at 54 in FIG. 4.

Once the polyurethane foamable material 52 has been added within the mold part 24, a cooperating mold part or component 56 of the mold assembly 22 is moved into cooperating relation with the lower vacuum mold part 24. The mold part 56 has a mold surface 58 which is shaped to define the interior surface of the panel 10. Thereafter, the foamable polyurethane material is foamed and cured under heat within the range of 100°–160° F. The curing results in a relatively rigid substrate 48 of foamed polyurethane with the fiberglass reinforcing mat embedded therein.

It can be seen that the resultant panel 10 which is removed from the mold assembly 22 has an arm rest portion 14 defined exteriorly by the vinyl sheet 40 and backed up not only by the relatively thin layer of relatively soft foamed material 42 but also by the foamed pad 46 with its critical softness-hardness characteristics. It will also be understood that the panel 10 can have a rug section 20 suitably adhered to the lower portion thereof as shown in FIG. 1.

It thus will be seen that the objects of this invention have been fully and effectively accomplished. It will be realized, however, that the foregoing preferred specific embodiment has been shown and described for the purpose of this invention and is subject to change without departure from such principles. Therefore, this invention includes all modifications encompassed within the spirit and scope of the following claims.

What is claimed is:

1. A method of making an interior panel of an automotive vehicle door having an exterior surface which is to face toward the interior of the automotive vehicle when installed therein, said method utilizing a mold assembly including cooperating opposed mold components having opposed mold surfaces shaped to form the exterior surface of the panel and an opposed surface thereof, the mold component with the mold surface shaped to form the exterior surface of the panel being a vacuum mold component having a mold surface arm rest portion defining an arm rest portion of the panel, said method comprising the steps of heating a laminate sheet comprising (1) an outer layer of vinyl sheet and (2) a layer of relatively soft foamed material bonded thereto, vacuum forming said heated laminate sheet in said vacuum mold component oriented so that an arm rest portion of the laminate sheet is defined by a surface of the vinyl sheet engaged with said mold surface arm rest portion, mounting a preformed pad of foamed elastomeric material having a density in the range of 30 to 45 pounds per cubic foot on a surface of the arm rest portion of the heated laminate sheet opposite the engaged vinyl sheet surface, placing a reinforcing mat over the mold surface defining the exterior surface of the panel and the heated laminate sheet vacuum formed thereon, adding foamable polyurethane material onto the reinforcing mat, and heating, foaming and curing the foamable polyurethane material while all of the mold components are in cooperating relation so as to form a panel which includes (1) a substrate defining the opposite surface thereof, (2) an arm rest portion defined on its exterior surface by said vinyl sheet and backed up therebelow by said layer of relatively soft foamed material and said pad of foamed elastomeric material.

2. A method as defined in claim 1 wherein said pad has a thickness of between ⅛" to ⅜".

3. A method as defined in claim 1 including the step of forming a bolster laminate including a textile outer layer, a flexible imperforate layer, and an inner surface of a material which becomes tacky when heated and mounting the bolster laminate in a portion of the mold surface of the first vacuum mold component prior to the vacuum forming of said laminated sheet so that during the vacuum forming step the vinyl sheet surface bondingly interengages the tacky material of the film inner layer of the bolster laminate.

4. A method as defined in claim 3 wherein said bolster laminate comprises a single unitary bolster laminate, and the mold surface of said first vacuum mold component includes a window sill portion defining the exterior of an upper window sill portion of the door panel, an arm rest portion spaced from said window sill portion defining the exterior surface of an arm rest portion of said door panel, the portion engaged by the textile outer layer of said bolster laminate being disposed between said window sill portion and said arm rest portion.

5. A method as defined in claim 4 wherein the portion of the mold surface of said first vacuum mold component on which said bolster laminate is mounted comprises a surface area bounded by a thin projecting peripheral lip having an interior surface extending from said surface area and an exterior surface from which the remaining mold surface extends, said bolster laminate being mounted on said mold surface area so that a marginal edge portion thereof lies along the interior surface of said peripheral lip, after the molding procedure has been completed and the panel has been removed from the mold assembly, the vinyl sheet surface which engaged the exterior surface of said lip is moved by the relatively soft foam material to abuttingly engage the marginal peripheral edge portion of said bolster laminate.

6. A method as defined in claim 5 wherein the textile outer layer of said bolster laminate is made of thermoplastic material, the surface area bounded by said lip including a non-planar surface design which is imparted to the engaged surface of textile outer layer of said bolster laminate and retained therein by virtue of the thermoplastic nature of the material thereof.

7. A method as defined in claim 3 wherein said bolster laminate includes an intermediate layer of foamed thermoplastic material.

* * * * *